United States Patent [19]

Lee

[11] Patent Number: 5,694,277
[45] Date of Patent: Dec. 2, 1997

[54] MAGNETIC HEAD WITH A HORIZONTAL SLIT CAPABLE OF READING MAGNETIC SIGNALS OF AT HIGH DENSITY

[75] Inventor: Byung-Kyu Lee, Seoul, Rep. of Korea

[73] Assignee: Daewoo Electronics Co., Ltd., Seoul, Rep. of Korea

[21] Appl. No.: 598,822

[22] Filed: Feb. 9, 1996

[30]   Foreign Application Priority Data

Jun. 30, 1995 [KR]   Rep. of Korea ............... 95-18647

[51] Int. Cl.$^6$ ................................................. G11B 5/23
[52] U.S. Cl. .................................... 360/110; 360/122
[58] Field of Search ............................. 360/119, 120, 360/122, 126

[56]   References Cited

U.S. PATENT DOCUMENTS 5,572,392   11/1996   Aboaf ..................................... 360/126

Primary Examiner—A. J. Heinz

Attorney, Agent, or Firm—Pennie & Edmonds, LLP

[57]   ABSTRACT

A magnetic head for use in a VCR includes a pair of cores, a pair of sets of coils, an insulating member, a thin film magnetic layer and a thin film protection layer. Furthermore, a method for the manufacture of the magnetic head includes the steps of: providing a pair of cores having an "T" shaped core and a "C" shaped core; forming an insulating member between posterior portions of the cores, joining the cores with each other; depositing a thin film magnetic layer on a frontal face of each of the cores; patterning the thin film magnetic layer in such a way that the thin film magnetic layer has a horizontal slit; and depositing a thin film protection layer on top of the thin film magnetic layer, thereby forming the magnetic head. Since the magnetic head has the thin film protection layer and the thin film magnetic layer with the horizontal slit which encompasses a magnetic gap and has the width thereof narrower than that of the magnetic gap, it is possible to record magnetic signals on a magnetic tape at high densities or reproduce the magnetic signals thus recorded, and hence it may have a lengthened life span.

3 Claims, 4 Drawing Sheets

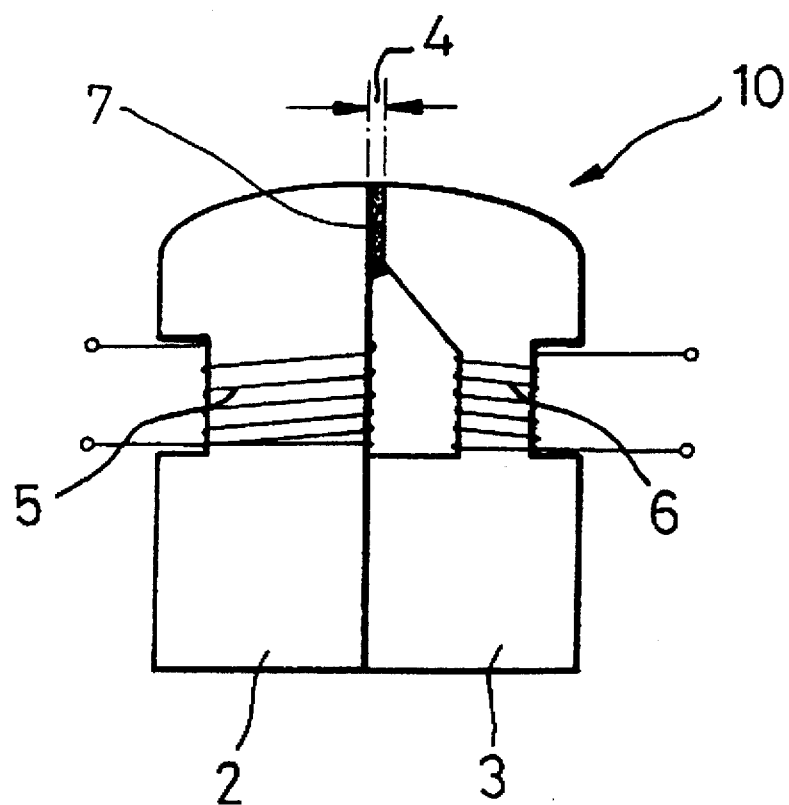

MAGNETIC HEAD WITH A HORIZONTAL SLIT CAPABLE OF READING MAGNETIC SIGNALS OF AT HIGH DENSITY

FIELD OF THE INVENTION

The present invention relates to a magnetic head for use in a video cassette recorder ("VCR"); and, more particularly, to an improved magnetic head and a method for the manufacture thereof, the magnetic head being capable of recording and reproducing magnetic signals of at high densities, and of preventing abrasion damages.

BACKGROUND OF THE INVENTION

As is well known, a VCR is equipped with a magnetic head for reproducing signals previously recorded on a magnetic tape, as well as for recording new signals thereon.

In FIG. 1, there is provided a cross sectional view of a magnetic head 10 for use in a VCR previously disclosed, the magnetic head 10 comprising a pair of cores 2, 3, coils 5, 6 and an insulating member 7.

The pair of cores 2, 3 includes an "T" shaped core 2 and a "C" shaped core 3, which are joined together by attaching a posterior portion of one core to a posterior portion of the other core by the insulating member 7, thereby forming a magnetic gap 4 between the anterior ends of the cores 2, 3. Each of the coils 5, 6 is threaded around the cores 2, 3, respectively.

Such a magnetic head 10 functions to reproduce a magnetic signal recorded on a magnetic tape (not shown) through the magnetic gap 4. As the magnetic gap 4 narrows or the magnetic head 10 is moved near the magnetic tape, a magnetic field of the recorded signal realigns a plurality of magnetic dipoles present in the pair of cores 2, 3, which, in turn, causes a change in the magnetic flux, inducing an electric signal in the coils 5, 6 threaded around each of the cores 2, 3. This electric signal is then provided to the rotor transformer (not shown) and then passed on to other parts of the VCR.

On the other hand, during a recording operation, an electric signal applied to the coils 5, 6, makes the magnetic dipoles in the pair of cores 2, 3 realign, and then generates a magnetic field around the magnetic gap 4, which is used to record a magnetic signal on the magnetic tape.

The amount of signals that can be recorded on an unit length of the magnetic tape, i.e., a signal density, depends on the magnitude of the magnetic gap 4. By narrowing the magnetic gap 4, it is possible to reduce the area of the tape needed to record a same amount of magnetic signals. Likewise, by narrowing the magnetic gap 4, it is possible to improve the resolution of the VCR to reproduce the magnetic signals recorded on the reduced smaller area of the tape. Thus, the signal density depends on the size of the magnetic gap 4.

There are certain deficiencies associated with the above described magnetic head 10, however. Since the magnetic gap 4 is generally formed by a mechanical process such as trimming or grinding and, with currently available techniques, it is impossible to construct a magnetic gap narrower than 0.3 μm, it is difficult to record or reproduce magnetic signals at high densities using the conventional magnetic head 10.

Furthermore, since the cores 2, 3 in the magnetic head 10 are made of a ferrite, wherein the ferrite has a Vicker's hardness of 500–600 Kgf/mm², it is easily worn out due to friction with the magnetic tape, thereby shortening the life span of the magnetic head 10.

SUMMARY OF THE INVENTION

It is, therefore, an object of the present invention to provide a magnetic head for use in a VCR capable of recording and reproducing magnetic signals at high densities.

It is another object of the present invention to provide a magnetic head for use in a VCR having an extended life span.

It is a further object of the present invention to provide a method for the manufacture of such a magnetic head for use in a VCR.

In accordance with one aspect of the present invention, there is provided a magnetic head for use in a VCR, the magnetic head comprising: a pair of cores, one of the cores having an "T" shape and the other, a "C" shape; a pair of sets of coils, each set of the coils being threaded around one of the cores corresponding thereto; an insulating member joining a posterior portion of one core to a posterior portion of the other core, thereby forming a magnetic gap between two anterior ends of the cores; a thin film magnetic layer located on a frontal face of each of the cores and having a horizontal slit of a certain length encompassing the magnetic gap, wherein the length of the horizontal slit is narrower than that of the magnetic gap, thereby making it possible for the magnetic head to record signals on a magnetic tape at high densities or to reproduce the signals thus recorded; and a thin film protection layer formed on top of the thin film magnetic layer for minimizing abrasion of the thin film magnetic layer due to friction with the magnetic tape.

In accordance with another aspect of the present invention, there is provided a method for the manufacture of a magnetic head for use in a VCR, the method comprising the steps of: providing a pair of cores, one of the cores having an "T" shape and the other a "C" shape; forming an insulating member between posterior portions of the cores, joining the cores together, thereby forming a magnetic gap between two anterior ends of the cores; depositing a thin film magnetic layer on a frontal face of each of the cores; patterning the thin film magnetic layer in such a way that the thin film magnetic layer has a horizontal slit encompassing the magnetic gap, wherein the length of the horizontal slit is narrower than that of the magnetic gap; and depositing a thin film protection layer on top of the thin film magnetic layer, thereby forming the magnetic head.

BRIEF DESCRIPTION OF THE DRAWINGS

The above and other objects and features of the present invention will become apparent from the following description of preferred embodiments when taken in conjunction with the accompanying drawings, in which:

FIG. 1 provides a cross sectional view of a magnetic head for use in a VCR previously disclosed;

DETAILED DESCRIPTION OF THE PREFERRED EMBODIMENTS

Figure 2A:
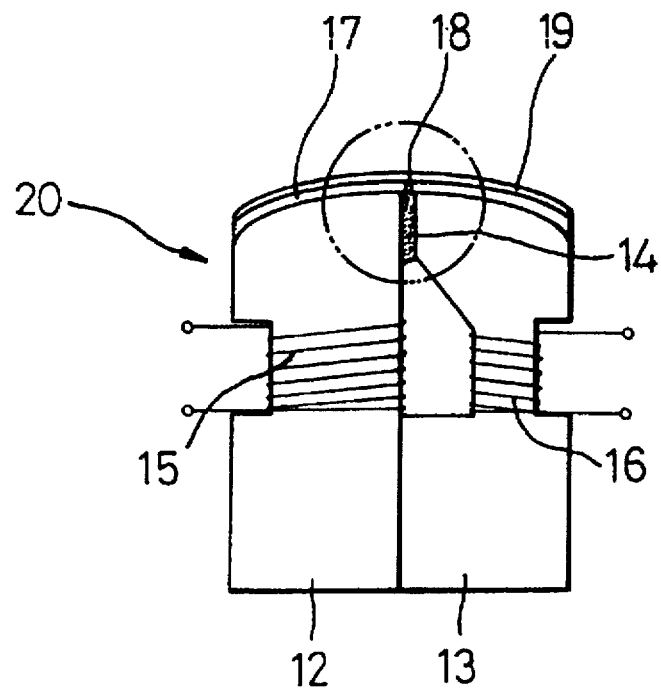
FIG. 2 shows a cross sectional view of a magnetic head for use in a VCR in accordance with the present invention.

There are shown in FIGS. 2 and 3A to 3D a cross sectional view of a magnetic head 20 for use in a VCR, and schematic cross sectional views setting forth a method for the manufacture thereof, respectively, in accordance with preferred embodiments of the present invention. It should be noted that like parts appearing in FIGS. 2 and 3A to 3D are represented by like reference numerals.

Figure 2B:
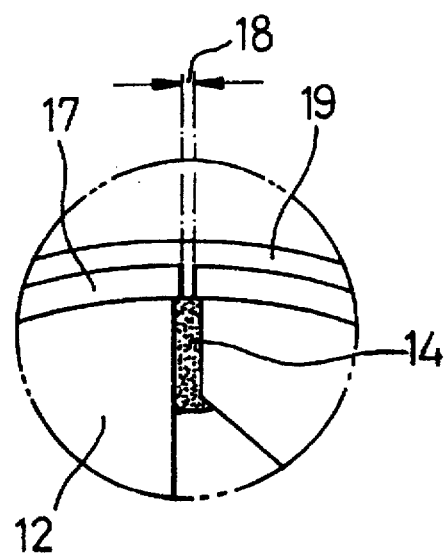

In FIG. 2, there is provided a cross sectional view of a magnetic head 20 for use in a VCR comprising a pair of cores 12, 13, a pair of sets of coils 15, 16, an insulating member 14, a thin film magnetic layer 17 and a thin film protection layer 19.

The pair of cores 12, 13 includes an "T" shaped core 12 and a "C" shaped core 13. Each set of the coils 15, 16 is threaded around the cores 12, 13, respectively. The insulating member 14 is made of glass and joins a posterior portion of one core to a posterior portion of the other core, thereby forming a magnetic gap between two anterior ends of the cores 12, 13. The thin film magnetic layer 17 is located on a frontal face of each of the cores 12, 13 and has a horizontal slit 18 encompassing the magnetic gap, wherein the length of the horizontal slit 18 is narrower than that of the magnetic gap, thereby making it possible for the magnetic head 20 to record magnetic signals on a magnetic tape(not shown) at high densities or reproduce the magnetic signals thus recorded. The thin film protection layer 19 is made of alumina($Al_2O_3$) and is positioned on top of the thin film magnetic layer 17, thereby preventing the thin film magnetic layer 17 from abrading away due to friction with the magnetic tape.

In FIGS. 3A to 3D, there are provided schematic cross sectional views setting forth a method for the manufacture of the magnetic head 20 shown in FIG. 2.

The process for the manufacture of the magnetic head 20 begins with the preparation of a pair of cores 12, 13, one of the cores 12 having an "T" shape, and the other core 13 having a "C" shape.

Figure 3A:
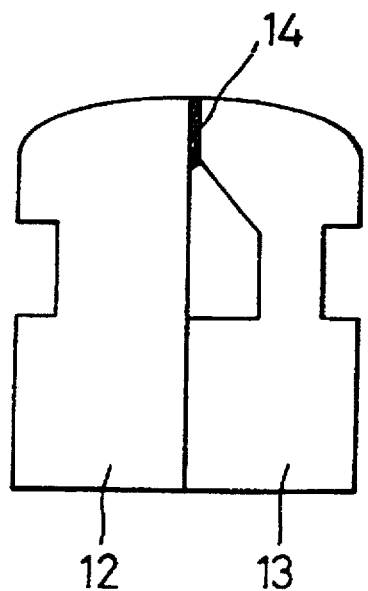
FIGS. 3A to 3D offer schematic cross sectional views illustrating the novel method for manufacturing the magnetic head shown in FIG. 2.

In a subsequent step, an insulating member 14 made of glass is formed at posterior portions of the cores 12, 13, joining the cores 12, 13 together, thereby forming a magnetic gap between two anterior ends of the cores 12, 13, as shown in FIG. 3A.

Figure 3B:
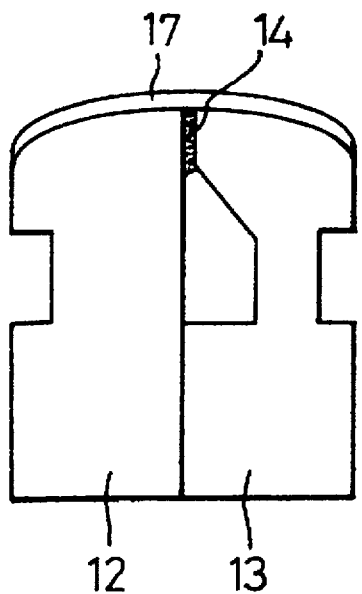

In an ensuing step, a thin film magnetic layer 17 is deposited on a frontal face of each of the cores 12, 13, as shown in FIG. 3B.

Figure 3C:
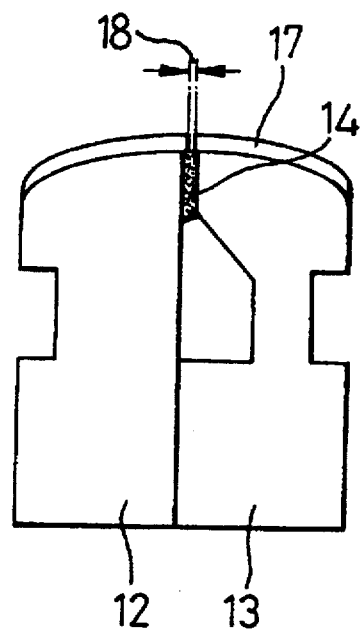

Thereafter, the thin film magnetic layer 17 is patterned in such a way that the thin film magnetic layer 17 has a horizontal slit 18 encompassing the magnetic gap, as shown in FIG. 3C. The length of the horizontal slit 18 is narrower than that of the magnetic gap.

Figure 3D:
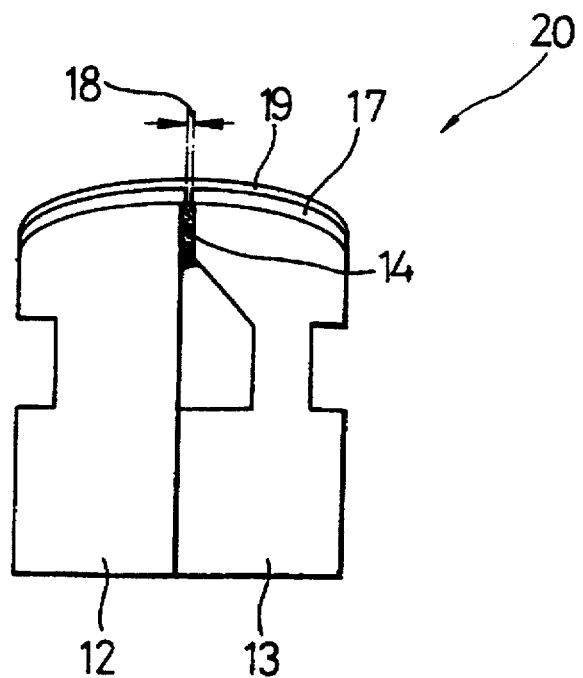

After the above step, a thin film protection layer 19 made of alumina($Al_2O_3$) is deposited on top of the thin film magnetic layer 17, thereby forming the magnetic head 20, as shown in FIG. 3D.

In the inventive magnetic head 20 and the method for the manufacture thereof, since the thin film magnetic layer 17 having the horizontal slit 18 is formed on the frontal face of each of the cores 12, 13, it is possible to structure a magnetic gap narrower than 0.3 µm, thereby making it possible to record a same amount of magnetic signals on a reduced smaller area of the tape. Likewise, by narrowing the magnetic gap, it is possible to improve the resolution of the VCR to reproduce the magnetic signals recorded on the reduced smaller area of the tape.

In addition, since the thin film protection layer 19 is formed on top of the thin film magnetic layer 17, the thin film magnetic layer 17 is prevented from abrading away due to friction with the magnetic tape, to thereby extend the life span of the thin film magnetic layer 17 and hence the magnetic head 20.

While the present invention has been described with respect to certain preferred embodiments only, other modifications and variations may be made without departing from the scope of the present invention as set forth in the following claims.

What is claimed is:

1. A video cassette recorder having a magnetic head therein, characterized in that the magnetic head comprises:

a pair of cores, one of the cores having an "T" shape and the other, a "C" shape;

a pair of sets of coils, each set of the coils being threaded around one of the cores corresponding thereto;

an insulating member joining a posterior portion of one core to a posterior portion of the other core, thereby forming a magnetic gap between two anterior ends of the cores;

a thin film magnetic layer located on a frontal face of each of the cores and having a horizontal slit of a certain length encompassing the magnetic gap, wherein the length of the horizontal slit defined by the length between portions thereof is narrower than that of the magnetic gap, thereby making it possible for the magnetic head to record signals on a magnetic tape at high densities or to reproduce the signals thus recorded; and a thin film protection layer formed on top of the thin film magnetic layer for minimizing abrasion of the thin film magnetic layer due to friction with the magnetic tape.

2. The video cassette recorder of claim 1, wherein the insulating member is made of glass.

3. The video cassette recorder of claim 1, wherein the thin film protection layer is made of alumina($Al_2O_3$).

* * * * *